United States Patent
Katanoda et al.

(10) Patent No.: US 10,141,781 B2
(45) Date of Patent: Nov. 27, 2018

(54) CONTACTLESS POWER TRANSFER SYSTEM, POWER RECEIVING DEVICE, AND POWER TRANSMISSION DEVICE

(71) Applicant: TOYOTA JIDOSHA KABUSHIKI KAISHA, Toyota-shi, Aichi-ken (JP)

(72) Inventors: Tomoya Katanoda, Toyota (JP); Junji Inoue, Tokai (JP); Yuki Tsunekawa, Toyota (JP); Yuji Abe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 15/409,050

(22) Filed: Jan. 18, 2017

(65) Prior Publication Data

US 2017/0214275 A1    Jul. 27, 2017

(30) Foreign Application Priority Data

Jan. 27, 2016  (JP) .................................. 2016-013128

(51) Int. Cl.
*H02J 50/10* (2016.01)
*B60L 11/18* (2006.01)
*H02J 50/80* (2016.01)

(52) U.S. Cl.
CPC ............. *H02J 50/10* (2016.02); *B60L 11/182* (2013.01); *H02J 50/80* (2016.02)

(58) Field of Classification Search
CPC  H02J 5/005; H02J 7/025; H02J 17/00; H02N 2/008; H04B 5/0025–5/0093;

(Continued)

(56) References Cited

U.S. PATENT DOCUMENTS

2010/0164439 A1\* 7/2010 Ido ......................... B60L 11/182
                                                          320/155
2011/0221387 A1\* 9/2011 Steigerwald .......... B60L 11/182
                                                          320/108

(Continued)

FOREIGN PATENT DOCUMENTS

JP    2010-288317 A    12/2010
JP    2013-110822 A     6/2013

(Continued)

OTHER PUBLICATIONS

U.S. Appl. No. 15/372,864, filed Dec. 8, 2016 in the name of Katanoda.

*Primary Examiner* — Rexford Barnie
*Assistant Examiner* — Thai Tran
(74) *Attorney, Agent, or Firm* — Oliff PLC

(57) ABSTRACT

A contactless power transfer system includes a power transmission device and a power receiving device. A second electronic control unit of the power transmission device is configured to determine whether a series of manipulations including severing connection between the power transmission device and the power supply via the power supply cable, and then connecting the power transmission device with the power supply again via the power supply cable, are performed. The second electronic control unit is configured to send a predetermined signal to the power receiving device when the second electronic control unit determines that the series of manipulations are performed. A first electronic control unit of the power receiving device is configured to generate a command for start of power transmission to the power transmission device, irrespective of the time schedule, when the first electronic control unit receives the signal.

5 Claims, 8 Drawing Sheets

(58) Field of Classification Search
CPC .................... B60L 5/005; B60L 11/182; B60L 11/1829–11/183; Y02T 90/122; H01F 27/006; H01F 27/02; H01F 38/14; H01F 2038/143–2038/146; H01R 13/6633; A61B 1/00029; A61N 1/378
USPC .......................................... 307/104; 320/108
See application file for complete search history.

(56) References Cited

U.S. PATENT DOCUMENTS

| | | |
|---|---|---|
| 2012/0074903 A1 | 3/2012 | Nakashima |
| 2013/0127409 A1 | 5/2013 | Ichikawa |
| 2013/0193749 A1 | 8/2013 | Nakamura et al. |
| 2014/0092243 A1* | 4/2014 | Ichikawa .................. B60L 7/14 348/143 |
| 2015/0008877 A1 | 1/2015 | Ichikawa et al. |
| 2016/0001667 A1 | 1/2016 | Masuda |
| 2016/0280078 A1 | 9/2016 | Tsukamoto |

FOREIGN PATENT DOCUMENTS

| | | |
|---|---|---|
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-166052 A | 9/2014 |
| WO | 2014/157096 A1 | 10/2014 |

* cited by examiner

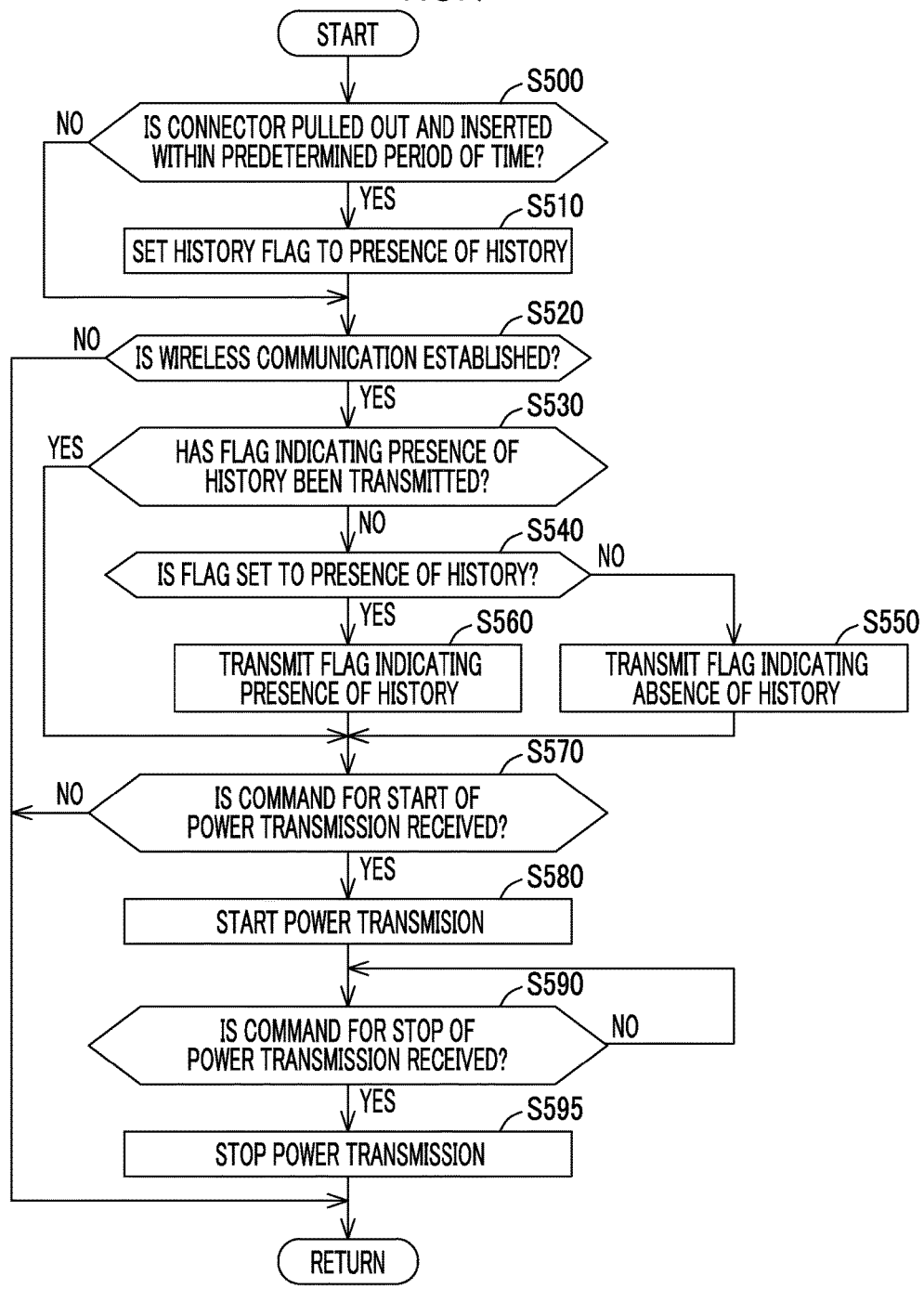

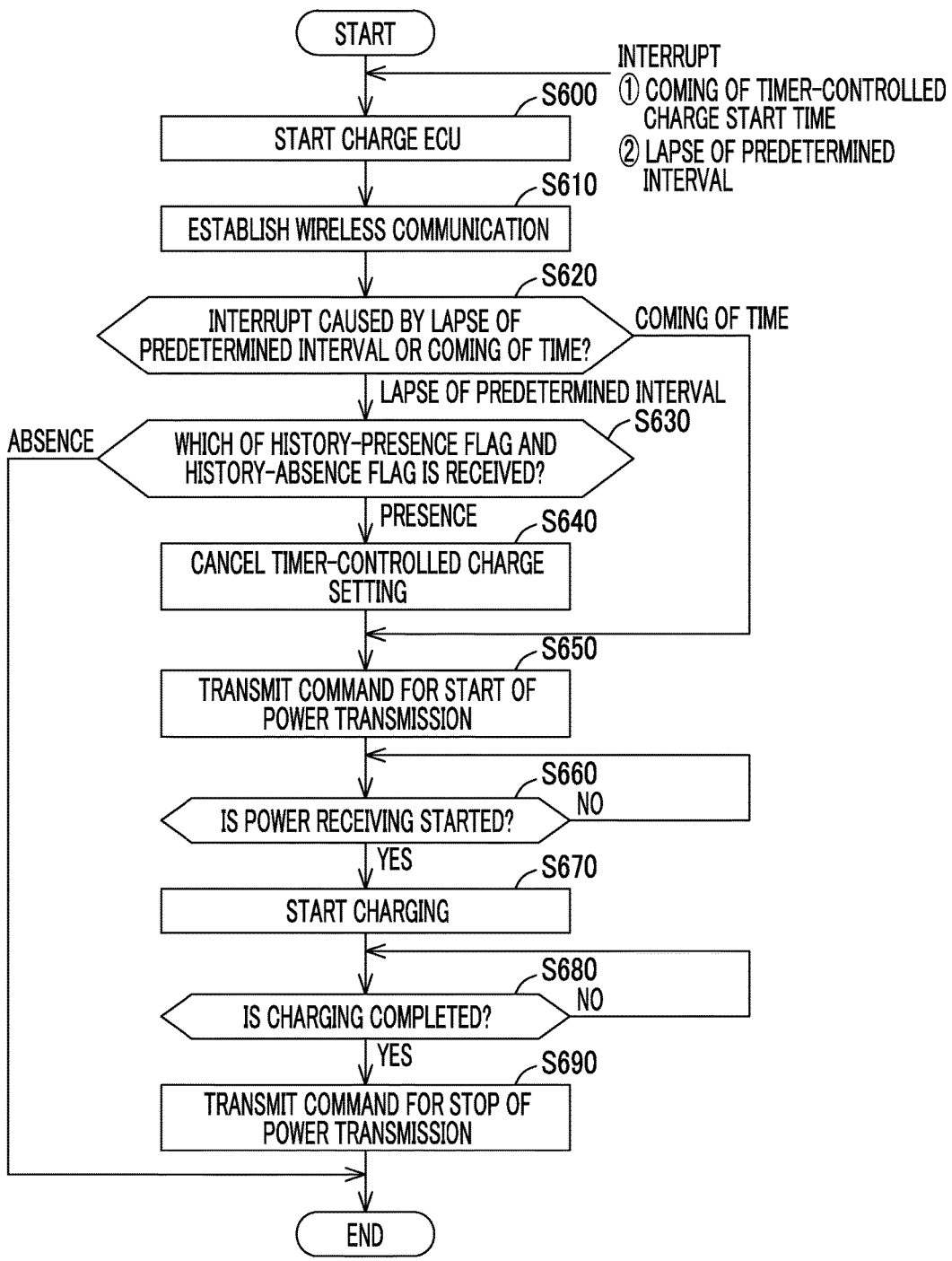

CONTACTLESS POWER TRANSFER SYSTEM, POWER RECEIVING DEVICE, AND POWER TRANSMISSION DEVICE

INCORPORATION BY REFERENCE

The disclosure of Japanese Patent Application No. 2016-013128 filed on Jan. 27, 2016 including the specification, drawings and abstract is incorporated herein by reference in its entirety.

BACKGROUND

1. Technical Field

The present disclosure relates to a contactless power transfer system, a power receiving device, and a power transmission device, and particularly relates to a technology of contactlessly or wirelessly transferring electric power between the power transmission device and the power receiving device.

2. Description of Related Art

Contactless power transfer systems each configured to contactlessly or wirelessly transfer electric power from a power transmission device to a power receiving device are known (see, for example, Japanese Patent Application Publications No. 2013-154815 (JP 2013-154815 A), No. 2013-146154 (JP 2013-146154 A), No. 2013-146148 (JP 2013-146148 A), No. 2013-110822 (JP 2013-110822 A), and No. 2013-126327 (JP 2013-126327 A)). For example, a contactless charging system in which a vehicle-mounted battery is charged with electric power contactlessly transmitted from a power transmitting unit of a power transmission device to a power receiving unit of a vehicle (power receiving device) is disclosed in JP 2013-154815 A.

SUMMARY

Regarding the contactless charging system as disclosed in JP 2013-154815 A, it has been under consideration to apply a technology (which will also be called "timer-controlled charge") of starting contactless charging according to a preset time schedule, to the system.

When the timer-controlled charge is performed in the contactless charging system, the power receiving device is held in a charge standby state until the charge start time according to the preset time schedule comes. If a trouble occurs to an input device used for cancelling timer-controlled charge setting, for example, in the case where the power receiving device is in the charge standby state, the user cannot cancel timer-controlled charge setting. In this case, even if the user wishes to immediately start contactless charging, contactless charging cannot be started until the charge start time according to the preset time schedule comes.

The present disclosure provides a contactless power transfer system, a power receiving device, and a power transmission device, which are able to start contactless charging according to the user's request, even if a trouble occurs to an input device, or the like, used for cancelling timer-controlled charge setting.

A contactless power transfer system according to a first aspect of the present disclosure includes a power transmission device, and a power receiving device. The power receiving device includes a power receiving unit, a power storage device, and a first electronic control unit. The power receiving unit is configured to contactlessly receive electric power from the power transmission device. The power storage device is configured to store the electric power received by the power receiving unit. The first electronic control unit is configured to generate a command for start of power transmission to the power transmission device, according to a preset time schedule, such that charging of the power storage device is started according to the time schedule. The power transmission device includes a power transmitting unit and a second electronic control unit. The power transmitting unit is configured to contactlessly transmit electric power obtained from a power supply provided outside the power transmission device, to the power receiving unit, in a condition where the power transmission device and the power supply are connected to each other via a power supply cable. The second electronic control unit is configured to determine whether a series of manipulations including severing connection between the power transmission device and the power supply via the power supply cable, and then connecting the power transmission device with the power supply again via the power supply cable, are performed within a predetermined period of time. The second electronic control unit is configured to send a predetermined signal to the power receiving device when the second electronic control unit determines that the series of manipulations are performed within the predetermined period of time. The first electronic control unit is configured to generate a command for start of power transmission to the power transmission device, irrespective of the time schedule, when the first electronic control unit receives the predetermined signal in the case where the time schedule is set.

A power receiving device according to a second aspect of the present disclosure is configured to contactlessly receive electric power from a power transmission device provided outside the power receiving device. The power transmission device includes a power transmitting unit and a second electronic control unit. The power transmitting unit is configured to contactlessly transmit electric power obtained from a power supply provided outside the power transmission device, to the power receiving unit, in a condition where the power transmission device and the power supply are connected to each other via a power supply cable. The second electronic control unit is configured to determine whether a series of manipulations including severing connection between the power transmission device and the power supply via the power supply cable, and then connecting the power transmission device with the power supply via the power supply cable, are performed within a predetermined period of time. The second electronic control unit is configured to send a predetermined signal to the power receiving device when the second electronic control unit determines that the series of manipulations are performed within the predetermined period of time. The power receiving device includes a power receiving unit, a power storage device, and a first electronic control unit. The power receiving unit is configured to contactlessly receive electric power from the power transmission device. The power storage device is configured to store the electric power received by the power receiving unit. The first electronic control unit is configured to generate a command for start of power transmission to the power transmission device, according to a preset time schedule, such that charging of the power storage device is started according to the time schedule. The first electronic control unit is configured to generate a command for start of power transmission to the power transmission device, irrespective of the time schedule, when the first electronic control unit receives the predetermined signal in the case where the time schedule is set.

A power transmission device according to a third aspect of the present disclosure is configured to contactlessly transmit electric power to a power receiving device provided outside the power transmission device. The power receiving device includes a power receiving unit, a power storage device, and a first electronic control unit. The power receiving unit is configured to contactlessly receive electric power from the power transmission device. The power storage device is configured to store the electric power received by the power receiving unit. The first electronic control unit is configured to generate a command for start of power transmission to the power transmission device, according to a preset time schedule, such that charging of the power storage device is started according to the time schedule. The first electronic control unit is configured to generate a command for start of power transmission to the power transmission device, irrespective of the time schedule, when the first electronic control unit receives a predetermined signal in a case where the time schedule is set. The power transmission device includes a power transmitting unit and a second electronic control unit. The power transmitting unit is configured to contactlessly transmit electric power obtained from a power supply provided outside the power transmission device, to the power receiving unit, in a condition where the power transmission device and the power supply are connected to each other via a power supply cable. The second electronic control unit is configured to determine whether a series of manipulations including severing connection between the power transmission device and the power supply via the power supply cable, and then connecting the power transmission device with the power supply again via the power supply cable, are performed within a predetermined period of time. The second electronic control unit is configured to send the predetermined signal to the power receiving device when the second electronic control unit determines that the series of manipulations are performed within the predetermined period of time.

According to the contactless power transfer system, power receiving device, and the power transmission device according to the first through third aspects of the present disclosure, when the series of manipulations including severing connection between the power transmission device and the power supply via the power supply cable, and then connecting the power transmission device with the power supply again via the power supply cable, was performed within the predetermined period of time, the predetermined signal is sent from the power transmission device to the power receiving device. Then, if the power receiving device receives the predetermined signal in the case where the time schedule is set, contactless charging is started irrespective of the preset time schedule. Accordingly, even if a trouble occurs to an input device, or the like, used for cancelling timer-controlled charge setting, the user is able to start contactless charging in the contactless power transfer system, by performing the series of manipulations within the predetermined period of time.

In the contactless power transfer system according to the first aspect of the present disclosure, the signal may be pulsed electric power in the form of predetermined pulses. The second electronic control unit may be configured to control the power transmitting unit so as to send the pulsed electric power to the power receiving unit, when it is determined that the series of manipulations was performed within the predetermined period of time. The first electronic control unit may be configured to generate a command for start of power transmission to the power transmission device, irrespective of the time schedule, when the pulsed electric power is received by the power receiving unit in the case where the time schedule is set.

According to the contactless power transfer system as described above, when the series of manipulations was performed within the predetermined period of time, electric power in the form of predetermined pulses is transmitted from the power transmitting unit of the power transmission device to the power receiving unit of the power receiving device. Accordingly, in the contactless power transfer system, it is possible to convey the fact that the series of manipulations was performed within the predetermined period of time, from the power transmission device to the power receiving device, by transmitting electric power in the form of pulses, without using any special communicating means.

In the contactless power transfer system according to the first aspect of the present disclosure, the power receiving device may include a first communicating unit that communicates with the power transmission device. The power transmission device may include a second communicating unit that communicates with the first communicating unit, and a storage unit that stores the presence or absence of a history of performance of the series of manipulations within the predetermined period of time. The signal may be a signal indicating the presence of the history. The first electronic control unit may be configured to control the first communicating unit so as to intermittently establish communication between the first communicating unit and the second communicating unit, when the time schedule is set. The second electronic control unit may be configured to control the second communicating unit so as to transmit the signal indicating the presence of the history to the first communicating unit, when the presence of the history is stored in the storage unit in the case where communication between the first communicating unit and the second communicating unit is established. The first electronic control unit may be configured to generate a command for start of power transmission to the power transmission device, irrespective of the time schedule, when the signal indicating the presence of the history is received via the first communicating unit in the case where the time schedule is set.

In the contactless power transfer system as described above, the signal indicating the presence of the history that the series of manipulations was performed within the predetermined period of time is transmitted from the power transmission device to the power receiving device when communication between the first and second communicating units is established. Accordingly, in the contactless power transfer system, it is possible to convey the fact that the above-indicated series of manipulations was performed within the predetermined period of time when communication between the first and second communicating units was not established, from the power transmission device to the power receiving device, when communication between the first and second communicating units is established.

With the contactless power transfer system, power receiving device, and the power transmission device according to the above aspects of the present disclosure, even if a trouble occurs to an input device, or the like, used for cancelling timer-controlled charge setting, it is possible to start contactless charging according to the user's request.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7 is a flowchart illustrating a control routine executed by a control device of a power transmission device; and FIG. 8 is a flowchart illustrating a control routine executed by a charge ECU of a vehicle when timer-controlled charge is set.

DETAILED DESCRIPTION OF EMBODIMENTS

Figure 1:
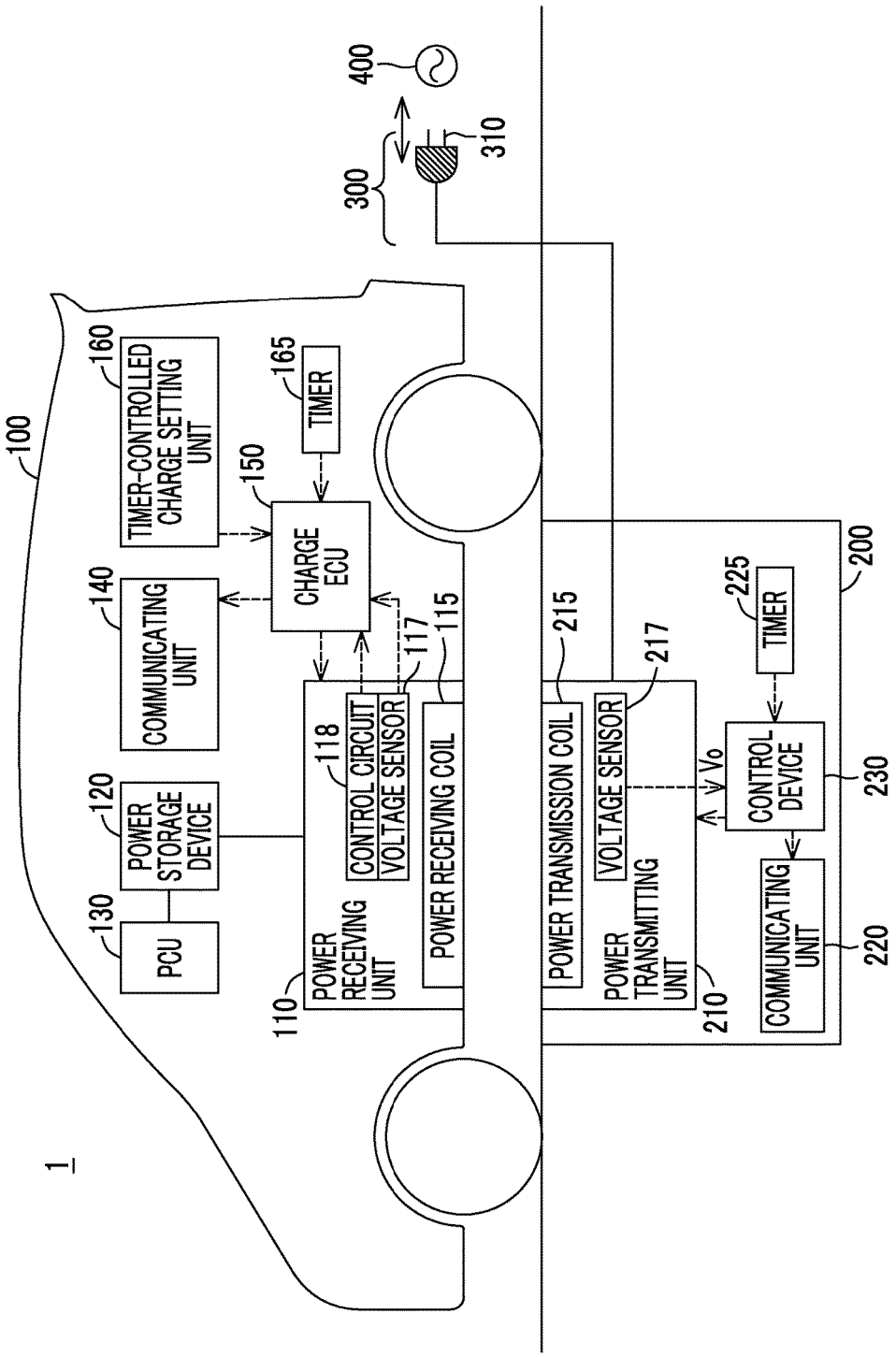
FIG. 1 is a view showing the configuration of a contactless power transfer system according to a first embodiment.

Some embodiments of the present disclosure will be described in detail with reference to the drawings. In the drawings, the same reference numerals are assigned to the same or corresponding portions or components, of which explanation will not be repeated.

FIG. 1 shows the configuration of a contactless power transfer system according to a first embodiment of the present disclosure. Referring to FIG. 1, the contactless power transfer system 1 includes a vehicle 100 and a power transmission device 200. In this system 1, electric power is contactlessly or wirelessly transferred between the vehicle 100 and the power transmission device 200.

The power transmission device 200 can be connected to a system power supply 400 provided outside the power transmission device 200, via a power supply cable 300. When a connector 310 provided at an end portion of the power supply cable 300 is inserted into a connector (not shown) of the system power supply 400, the power transmission device 200 is connected to the system power supply 400. When the connector 310 is pulled out from the connector of the system power supply 400, the power transmission device 200 and the system power supply 400 are disconnected from each other. The power transmission device 200 transmits transmission power produced based on electric power received from the system power supply 400 via the power supply cable 300, to the vehicle 100.

The power transmission device 200 includes a power transmitting unit 210, a communicating unit 220, a timer 225, and a control device 230. The power transmitting unit 210 includes a power transmission coil 215, and a voltage sensor 217. The power transmitting unit 210 also includes a power conversion device (not shown). The power conversion device includes an inverter or a converter, for example, and converts electric power received from the system power supply 400, into desired transmission power (AC).

The power transmission coil 215 is supplied with the transmission power produced by the power conversion device, so as to form a magnetic field, and contactlessly transmits electric power to a power receiving coil 115 (which will be described later) of a power receiving unit 110 via the magnetic field thus formed. The number of turns of the power transmission coil 215 is designed as appropriate so that the Q value and the coupling coefficient κ become large (for example, Q≥100).

The voltage sensor 217 detects voltage applied via the power supply cable 300. The result of detection by the voltage sensor 217 is output to the control device 230. The voltage detected by the voltage sensor 217 changes when the connector 310 is inserted into or pulled out from the system power supply 400. More specifically, if the connector 310 is pulled out from the system power supply 400, the voltage detected by the voltage sensor 217 is lowered. Accordingly, the control device 230 is able to detect a connecting state of the connector 310 with the system power supply 400, by monitoring the output V0 of the voltage sensor 217.

The communicating unit 220 is able to communicate with a communicating unit 140 (which will be described later) of the vehicle 100. For example, the communicating unit 220 performs communication of various kinds of information needed for contactless power transfer between the vehicle 100 and the power transmission device 200. The communicating unit 220 is provided by, for example, a communication module according to wireless LAN standards, such as IEEE (Institute of Electrical and Electronic Engineers) 802.11.

The timer 225 has a clock function. The timer 225 incorporates a battery, and operates without receiving electric power from the system power supply 400. Also, the timer 225 keeps measuring the time even while the control device 230 is stopped. The information of the time measured by the timer 225 is output to the control device 230. The information of the time measured by the timer 225 is used for, for example, measuring an interval between pull-out of the connector 310 from the system power supply 400 and insertion of the connector 310 into the system power supply 400. The purpose of measuring the interval between pullout and insertion of the connector 310 from and into the system power supply 400 will be described in detail later.

The control device 230 has a CPU (Central Processing Unit) (not shown), and an internal memory, and controls each component (e.g., the power transmitting unit 210 and the communicating unit 220) of the power transmission device 200, based on information stored in the internal memory and information from each sensor (e.g., the voltage sensor 217). The internal memory of the control device 230 is provided by a non-volatile memory, such as a flash memory.

The vehicle 100 includes a power receiving unit 110, power storage device 120, PCU (Power Control Unit) 130, communicating unit 140, charge ECU (Electronic Control Unit) 150, timer-controlled charge setting unit 160, and a timer 165. In the vehicle 100, electric power contactlessly or wirelessly received from the power transmission device 200 is stored in the power storage device 120. Then, driving force for traveling the vehicle 100 is generated based on electric power stored in the power storage device 120.

The power receiving unit 110 includes a power receiving coil 115, a voltage sensor 117, and a control circuit 118. The power receiving unit 110 also includes a power conversion device (not shown). The power conversion device included in the power receiving unit 110 includes a rectifier, for example.

The power receiving coil 115 contactlessly receives electric power from the power transmission coil 215. The electric power (AC) received by the power receiving unit 110 is converted into DC power by the power conversion device, and stored in the power storage device 120. The number of turns of the power receiving coil 115 is designed as appropriate so that the Q value and the coupling coefficient K become large (for example, Q≥100).

The voltage sensor 117 detects the voltage received by the power receiving coil 115. The result of detection by the voltage sensor 117 is output to the charge ECU 150. When electric power in the form of predetermined pulses (which will be described later) is detected by the voltage sensor 117, the control circuit 118 executes an interrupt routine for starting the charge ECU 150 that has been stopped. What situations under which the interrupt routine is executed will be described in detail later.

The power storage device 120 is an electric power storage element that can be charged with electric power and discharge electric power. The power storage device 12 includes a secondary battery, such as a lithium-ion battery, nickel hydride battery, or a lead storage battery, or a power storage device, such as an electric double layer capacitor.

The PCU 130 includes an inverter, a motor connected to the inverter, and so forth, and generates driving force for traveling the vehicle 100, using electric power supplied from the power storage device 120.

The communicating unit 140 is able to communicate with the communicating unit 220 of the power transmission device 200. For example, the communicating unit 140 is provided by, for example, a communication module according to wireless LAN standards, such as IEEE 802.11.

The charge ECU 150 has a CPU and an internal memory (not shown), and controls each component (e.g., the power receiving unit 110 and the communicating unit 140) of the vehicle 100, based on information stored in the internal memory and information from each sensor (e.g., the voltage sensor 117). The internal memory of the charge ECU 150 is provided by a non-volatile memory, such as a flash memory.

One of the functions implemented by the charge ECU 150 is a timer-controlled charge function. The timer-controlled charge function is a function of starting contactless charging according to a preset time schedule. For example, the user can enter the scheduled time of the next departure of the vehicle 100, via the timer-controlled charge setting unit 160 (which will be described later). In this case, the charge ECU 150 can complete charge of the power storage device 120, by the scheduled departure time entered by the user, and also create a time schedule so that contactless charging is performed in a time period in which the electricity cost is lowest. The time schedule thus created is stored in the internal memory of the charge ECU 150.

If the charge start time according to the time schedule of timer-controlled charge (which will also be simply called "charge start time") comes, in a condition where the vehicle 100 is parked at a position where electric power can be transmitted from the power transmission coil 215 to the power receiving coil 115, contactless charging is started in the contactless power transfer system 1. Namely, the vehicle 100 is held in a charge standby state until the charge start time comes. In the vehicle 100 according to the first embodiment, the vehicle system is stopped (the charge ECU 150 is stopped) during a charge standby period. The timer-controlled charge function will be described in detail later.

The timer-controlled charge setting unit 160 is an input device for entering information concerning timer-controlled charge. For example, the timer-controlled charge setting unit 160 is provided by a monitor having a touch panel. The user can enter the scheduled time of the next departure of the vehicle 100, for example, via the timer-controlled charge setting unit 160. The user can also cancel timer-controlled charge setting, via the timer-controlled charge setting unit 160.

The timer 165 has a clock function of measuring the time. The timer 165 keeps measuring the time even while the charge ECU 150 is stopped. The time information measured by the timer 165 is output to the charge ECU 150. When the time measured by the timer 165 reaches the charge start time, an interrupt routine for starting the charge ECU 150 that has been stopped is executed, in the charge ECU 150. What situations under which the interrupt routine is executed will be described in detail later.

When the timer-controlled charge is set in the vehicle 100, the vehicle 100 is held in a charge standby state until the charge start time comes, as described above. If a trouble occurs to the timer-controlled charge setting unit 160 when the vehicle 100 is in the charge standby state, the user cannot cancel timer-controlled charge setting via the timer-controlled charge setting unit 160. In this case, if the timer-controlled charge setting unit 160 is the only means for cancelling timer-controlled charge setting, contactless charging cannot be started until the charge start time comes, even if the user wishes to immediately start contactless charging.

In the contactless power transfer system 1 according to the first embodiment, when a series of manipulations is performed within a predetermined period of time, the control device 230 of the power transmission device 200 controls the power transmitting unit 210 so as to transmit electric power in the form of predetermined pulses (which will also be called "request pulses") from the power transmission coil 215 to the power receiving coil 115. The above-mentioned series of manipulations consists of severing connection between the power transmission device 200 and the system power supply 400 via the power supply cable 300, and then connecting the power transmission device 200 and the system power supply 400 via the power supply cable 300 again. When the request pulses are received by the power receiving coil 115 in the case where the time schedule of timer-controlled charge is set in the vehicle 100, the charge ECU 150 of the vehicle 100 issues a command to start power transmission, to the power transmission device 200, irrespective of the time schedule of timer-controlled charge.

The above-indicated predetermined period of time is a certain length of time that can be distinguished from a length of time required from the time when the connector 310 is pulled out from the system power supply 400 at the time of departure of the vehicle 100, to the time when the connector 310 is inserted again into the system power supply 400 at the time of return home of the vehicle 100. For example, the predetermined period of time is 30 to 60 seconds.

Thus, according to the contactless power transfer system 1, even if a trouble occurs to the input device (the timer-controlled charge setting unit 160) used for cancelling timer-controlled charge setting in the vehicle 100, the user is able to forcedly start contactless charging before the charge start time comes, by performing the series of manipulations within the predetermined period of time.

The control device 230 determines whether the series of manipulations was performed within the predetermined period of time. If the control device 230 detects pullout of the connector 310 from the system power supply 400, based on reduction of the output of the voltage sensor 217, it immediately stores time information received from the timer 225 in the internal memory (not shown). Then, the control device 230 is stopped since no electric power is supplied from the system power supply 400.

If the connector 310 is inserted again into the system power supply 400, so that supply of electric power from the system power supply 400 is resumed, the control device 230 is restarted. The control device 230 calculates a difference between the time information received from the timer 225 at the time of restart, and the time information stored in the internal memory (the time at which the connector 310 was pulled out from the system power supply 400). In this manner, the control device 230 can calculate the time required to perform the series of manipulations. The control device 230 can determine whether the series of manipulations was performed within the predetermined period of time, by comparing the calculated time difference and the predetermined time period.

Figure 2:
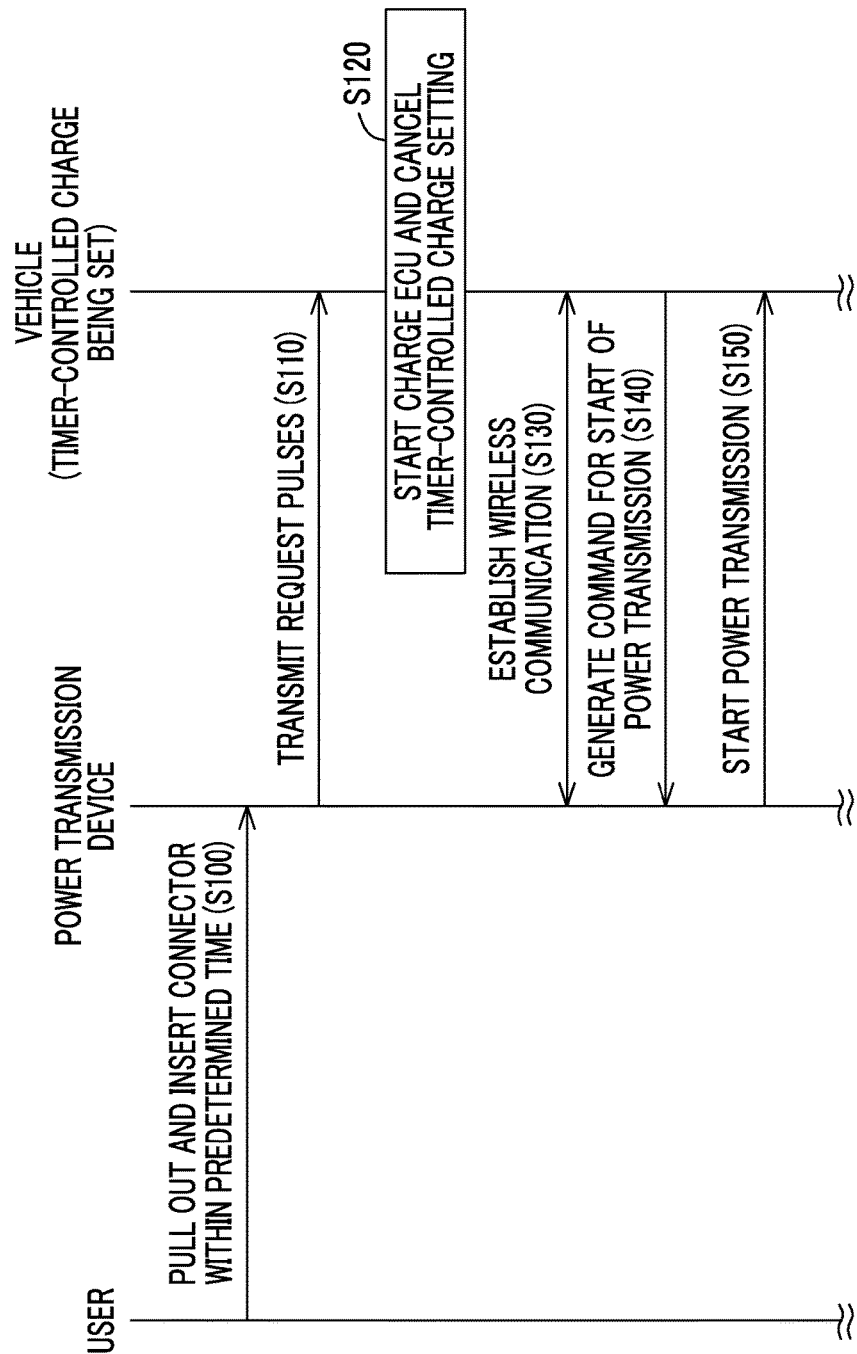
FIG. 2 is a sequence diagram showing an example in which contactless charging is forcedly started before the charge start time comes in the contactless power transfer system.

FIG. 2 is a sequence diagram showing an example in which contactless charging is forcedly started before the charge start time comes in the contactless power transfer system 1. Referring to FIG. 2, operation of the user, processing of the power transmission device 200, and processing of the vehicle 100 are indicated in this order as viewed from the left-hand side, and the time elapses in a direction from the upper side toward the lower side. In this example, timer-controlled charge setting is made in the vehicle 100, and the vehicle system is initially in a stopped state (the charge ECU 150 is in a stopped state).

If the user performs a series of manipulations (pullout and insertion of the connector 310 from and into the system power supply 400) within a predetermined period of time (step S100), request pulses are transmitted from the power transmission device 200 to the vehicle 100 (step S110). If the request pulses are received in the vehicle 100, the charge ECU 150 is started, and timer-controlled charge setting is cancelled (step S120).

Then, a request for establishment of wireless communication is transmitted from the vehicle 100 to the power transmission device 200, and wireless communication is established between the vehicle 100 and the power transmission device 200 (step S130). Then, if a command for start of power transmission is transmitted from the vehicle 100 to the power transmission device 200, via wireless communication (step S140), electric power transmission from the power transmission device 200 to the vehicle 100 is started, in response to the command for start of power transmission (step S150).

Thus, in the contactless power transfer system 1 according to the first embodiment, even if a trouble occurs to the input device (the timer-controlled charge setting unit 160) used for cancelling timer-controlled charge setting, the user can forcedly start contactless charging before the charge start time comes, by performing the series of manipulations within the predetermined period of time. Next, the operation of the power transmission device 200 and the vehicle 100 in the case where timer-controlled charge is set in the vehicle 100 will be described.

Figure 3:
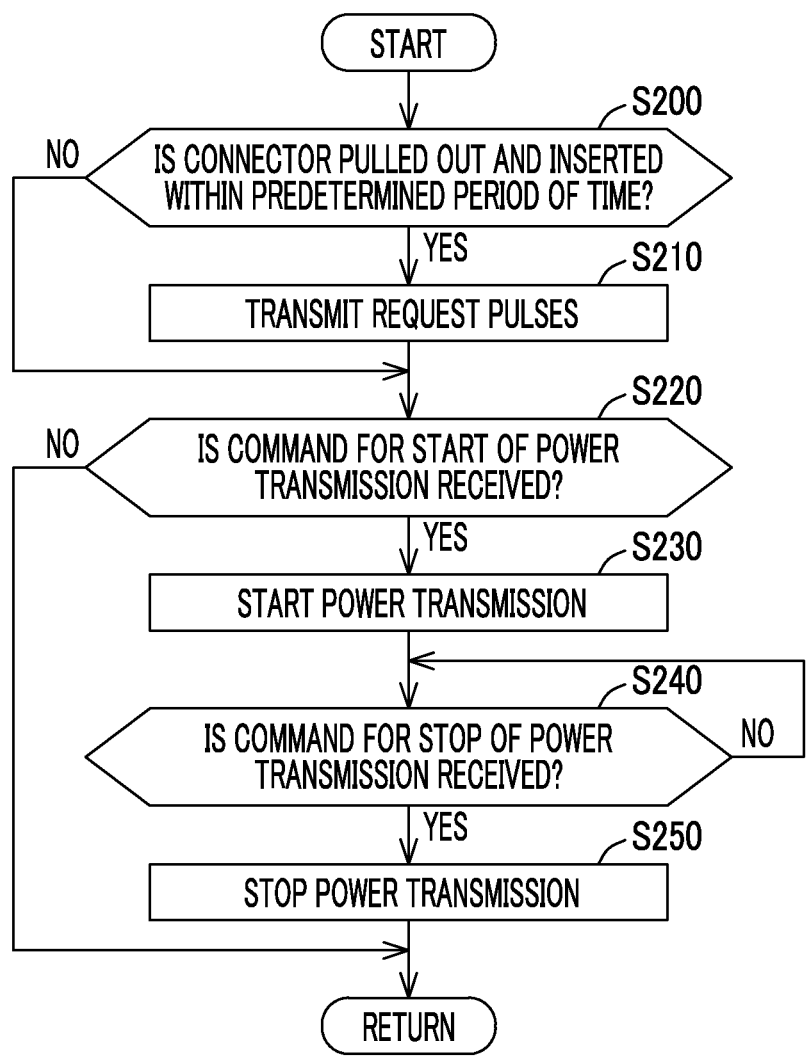
FIG. 3 is a flowchart illustrating a control routine executed by a control device of a power transmission device.

FIG. 3 is a flowchart illustrating a control routine executed by the control device 230 of the power transmission device 200. The control routine illustrated in the flowchart of FIG. 3 is repeatedly executed by the control device 230.

Referring to FIG. 3, the control device 230 determines whether the connector 310 was pulled out from the system power supply 400 and inserted into the system power supply 400 within a predetermined period of time (step S200). If it is determined that the connector 310 was pulled out from and inserted into the system power supply 400 within the predetermined period of time (YES in step S200), the control device 230 controls the power transmitting unit 210 to transmit request pulses to the power receiving unit 110, so as to inform the vehicle 100 that the series of manipulations was performed within the predetermined period of time (step S210). The transmission of the request pulses is performed by, for example, transmitting weak electric power of several dozens to several hundreds of W (watts) for several seconds.

If the request pulses are transmitted in step S210, or if it is determined that the connector 310 was not pulled out from and inserted into the system power supply 400 in step S200 (NO in step S200), the control device 230 determines whether it has received a command for start of power transmission (which will be described later) from the vehicle 100 via the communicating unit 220 (step S220). If it is determined that the command for start of power transmission has not been received (NO in step S220), the control proceeds to "RETURN".

If it is determined that the command for start of power transmission has been received (YES in step S220), the control device 230 controls the power transmitting unit 210 so as to start transmission of electric power for charge of the power storage device 120 (step S230). Then, the control device 230 determines whether it has received a command for stop of power transmission (which will be described later) from the vehicle 100 via the communicating unit 220 (step S240). If it is determined that the command for stop of power transmission has not been received (NO in step S240), the control device 230 controls power transmitting unit 210 so as to continue power transmission for charge of the power storage device 120.

If it is determined that the command for stop of power transmission has been received (YES in step S240), the control device 230 controls the power transmitting unit 210 so as to stop power transmission for charge of the power storage device 120 (step S250). Then, the control proceeds to "RETURN".

Thus, the power transmission device 200 according to the first embodiment transmits the request pulses to the vehicle 100 when the series of manipulations was performed within the predetermined period of time. Accordingly, the power transmission device 200 can inform the vehicle 100 that the series of manipulations was performed by the user within the predetermined period of time, by transmitting the request pulses, without using any special communicating means.

Figure 4:
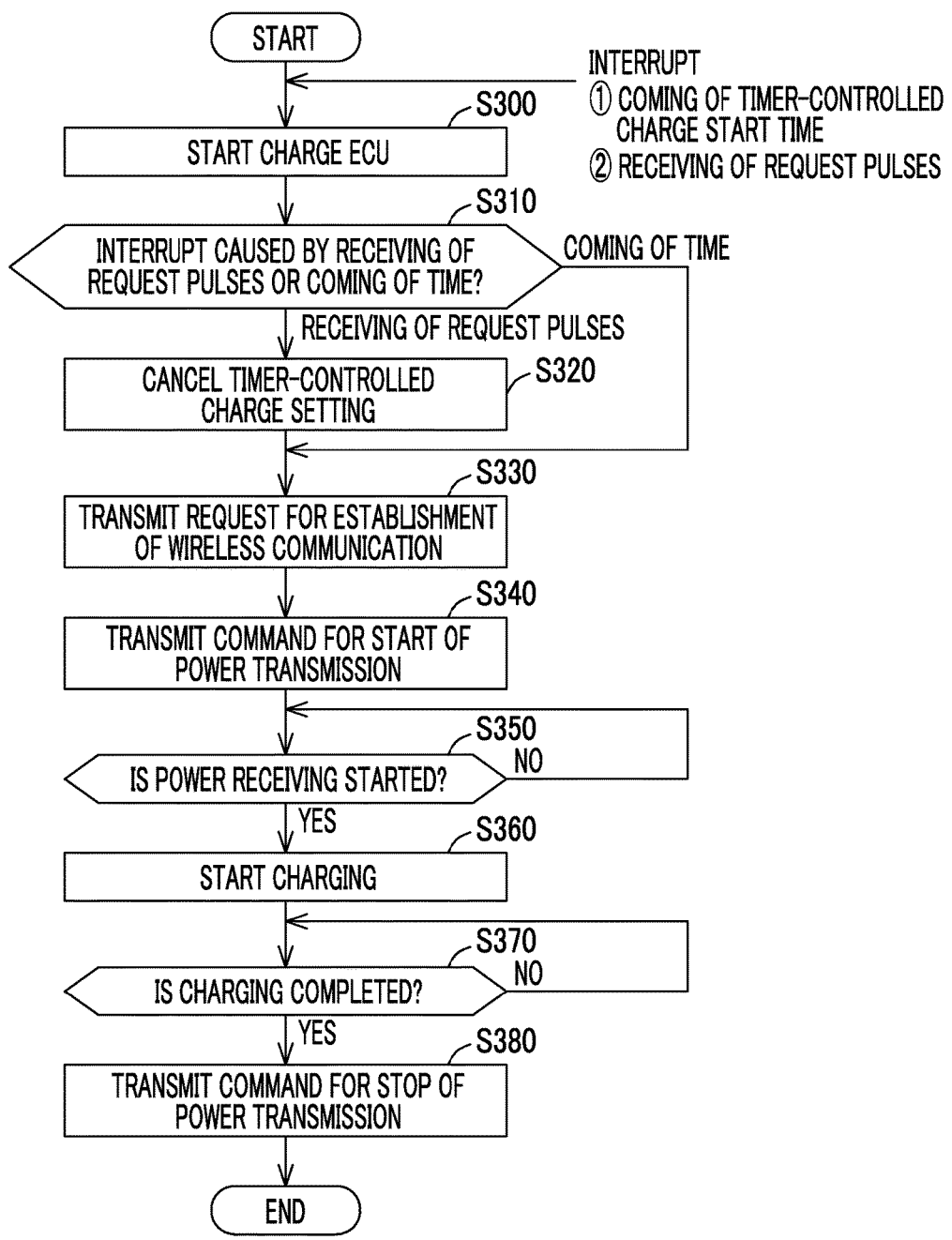
FIG. 4 is a flowchart illustrating a control routine executed by a charge ECU of a vehicle when timer-controlled charge is set.

FIG. 4 is a flowchart illustrating a control routine executed by the charge ECU 150 of the vehicle 100 when timer-controlled charge is set. The charge ECU 150 is started when the charge start time set for timer-controlled charge comes, or when the request pulses are received by the power receiving coil 115, and the control routine illustrated in the flowchart of FIG. 4 is executed by the charge ECU 150 after the charge ECU 15 is started.

As described above, when the time measured by the timer 165 reaches the charge start time, an interrupt routine for starting the charge ECU 150 that has been stopped is executed in the charge ECU 150. Also, the control circuit 118 (FIG. 1) is configured to detect receiving of request pulses by the power receiving coil 115. If the control circuit 118 detects receiving of the request pulses, it executes the interrupt routine for starting the charge ECU 150.

Referring to FIG. 4, if the interrupt routine is executed for either of the above reasons, the charge ECU 150 is started (step S300). Then, the charge ECU 150 determines whether execution of the interrupt routine is caused by coming of the charge start time, or caused by receiving of the request pulses by the power receiving coil 115 (step S310).

If it is determined that execution of the interrupt routine is caused by receiving of the request pulses ("RECEIVING OF REQUEST PULSES" in step S310), the charge ECU 150 cancels timer-controlled charge setting (step S320). For example, the charge ECU 150 blanks out or cancels the time schedule of timer-controlled charge stored in the internal memory.

If the timer-controlled charge setting is cancelled in step S320, or it is determined in step S310 that execution of the interrupt routine is caused by coming of the charge start time ("COMING OF TIME" in step S310), the charge ECU 150 controls the communicating unit 140 so as to send a request for establishment of wireless communication to the power transmission device 200, since it is necessary to send a command for start of power transmission to the power transmission device 200 via wireless communication (step S330). As a result, wireless communication is established between the vehicle 100 and the power transmission device 200.

Then, the charge ECU 150 controls the communicating unit 140 so as to send the command for start of power transmission to the power transmission device 200 (step S340). If the command for start of power transmission is sent, the charge ECU 150 determines whether receiving of electric power based on power transmission of the power transmission device 200 has started (step S350). More specifically, when the output of the voltage sensor 117 becomes equal to or larger than a predetermined value, the charge ECU 150 determines that receiving of electric power based on power transmission of the power transmission device 200 has started. Here, the predetermined value is the minimum value of electric power transmitted from the power transmission coil 215 to the power receiving coil 115. If it is determined that receiving of electric power has not started (NO in step S350), the charge ECU 150 waits until receiving of electric power is started.

If it is determined that receiving of electric power has started (YES in step S350), the charge ECU 150 performs control for starting charging of the power storage device 120 (step S360). Then, the charge ECU 150 detects or determines whether the power storage device 120 has been fully charged, for example, so as to determine whether charging of the power storage device 120 has been completed (step S370). If it is determined that charging of the power storage device 120 has not been completed (NO in step S370), the charge ECU 150 continues charging of the power storage device 120 until charging is completed.

If it is determined that charging of the power storage device 120 has been completed (YES in step S370), the charge ECU 150 controls the communicating unit 140 so as to send a command for stop of power transmission to the power transmission device 200 (step S380). Then, the control proceeds to "END".

Thus, in the vehicle 100 according to the first embodiment, when the request pulses are received by the power receiving coil 115, the timer-controlled charge setting is cancelled, and charging of the power storage device 120 is started.

As described above, in the contactless power transfer system 1 according to the first embodiment, if the user performs a series of manipulations within a predetermined period of time while timer-controlled charge is set, a predetermined signal (request pulses) is transmitted from the power transmission device 200 to the vehicle 100. Then, when the vehicle 100 receives the predetermined signal (request pulses), contactless charging is started irrespective of the preset time schedule. Accordingly, even if a trouble or problem occurs to the input device, or the like, used for cancelling timer-controlled charge setting in the vehicle 100, the user can start contactless charging in the contactless power transfer system 1, by performing the series of manipulations within the predetermined period of time.

In the contactless power transfer system 1 according to the first embodiment, when the user performs a series of manipulations within a predetermined period of time during a charge standby period of the vehicle 100, contactless charging is started, in response to request pulses transmitted from the power transmission device 200 to the vehicle 100. In a contactless power transfer system 1A according to a second embodiment of the present disclosure, contactless charging is forcedly started, in response to a signal transmitted from a power transmission device 200A to a vehicle 100A. The signal indicates a history of performance of a series of manipulations by the user within a predetermined period of time, during a charge standby period of the vehicle 100A.

The configuration of the contactless power transfer system 1A, and the operation of the power transmission device 200A and the vehicle 100A in the case where timer-controlled charge is set in the vehicle 100A will be described in this order.

Figure 5:
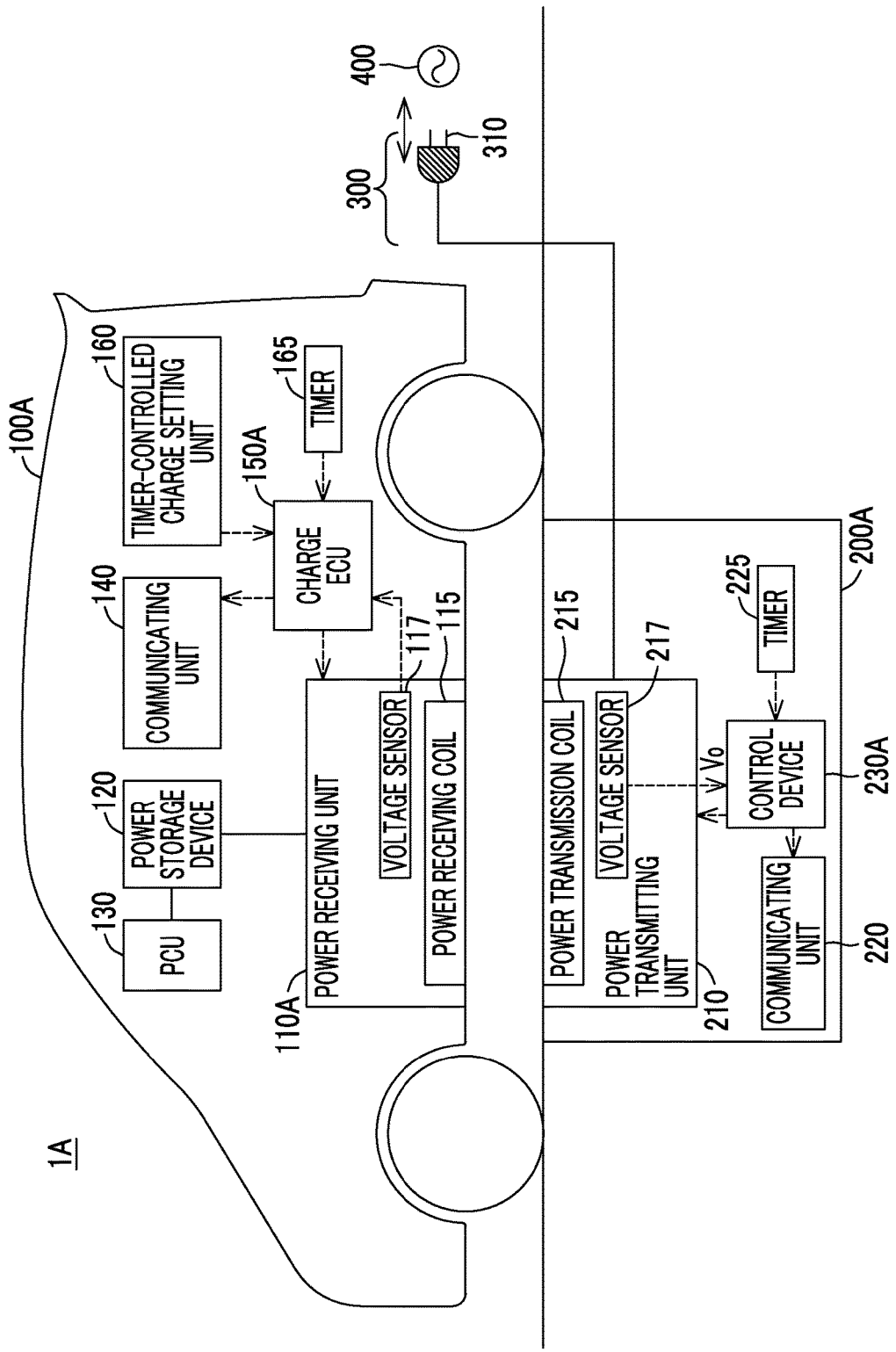
FIG. 5 is a view showing the configuration of a contactless power transfer system according to a second embodiment.

FIG. 5 illustrates the configuration of the contactless power transfer system according to the second embodiment. Referring to FIG. 5, the contactless power transfer system 1A according to the second embodiment includes the vehicle 100A and the power transmission device 200A. The vehicle 100A includes a power receiving unit 110A and a charge ECU 150A.

Unlike the power receiving unit 110 of the first embodiment, the power receiving unit 110A does not have a component (control circuit 118) for detecting request pulses. A control routine executed by the charge ECU 150A (which will be described later) is different from the control routine executed by the charge ECU 150 in the first embodiment. In other respects, the vehicle 100A is identical with the vehicle 100 of the first embodiment.

The power transmission device 200A includes a control device 230A. A control routine executed by the control device 230A (which will be described later) is different from the control routine executed by the control device 230 of the first embodiment. In other respects, the power transmission device 200A is identical with the power transmission device 200 of the first embodiment.

When the vehicle 100A is in a charge standby period, waiting for timer-controlled charge, the vehicle system is intermittently started for the sake of electric power saving. Namely, when the vehicle 100A is in the standby period for timer-controlled charge, the charge ECU 150A is repeatedly started and stopped at predetermined intervals. The predetermined interval is, for example, five to ten minutes.

In the contactless power transfer system 1A, the fact that the user performed a series of manipulations within a predetermined period of time is transmitted, via wireless communication, from the power transmission device 200A to the vehicle 100A. However, since wireless communication is not established between the vehicle 100A and the power transmission device 200A while the system of the vehicle 100A is stopped, the fact that the user performed the series of manipulations within the predetermined period of time cannot be immediately transmitted from the power transmission device 200A to the vehicle 100A.

Thus, if the user performed the series of manipulations within the predetermined period of time while the system of the vehicle 100A is stopped, the control device 230A of the power transmission device 200A once stores the history of performance of the series of manipulations within the predetermined period of time, in the internal memory. More specifically, the control device 230A stores a flag (which will also be called "history flag") indicating whether the user performed the series of manipulations within the predetermined period of time, in the internal memory. If the series of manipulations was performed by the user within the predetermined period of time, the history flag is set to a flag indicating the presence of the history. The history flag thus set to the flag indicating the presence of the history will also be called "FLAG INDICATING PRESENCE OF HISTORY". On the other hand, the history flag that is set to a flag indicating the absence of the history will also be called "FLAG INDICATING ABSENCE OF HISTORY".

Then, if the charge ECU 150A is started, and wireless communication is established between the vehicle 100A and the power transmission device 200A, the control device 230A performs control for transmitting the history flag to the vehicle 100A. In this manner, the fact that the user performed the series of manipulations within the predetermined period of time before wireless communication is established can be transmitted from the power transmission device 200A to the vehicle 100A after wireless communication is established. Once the flag indicating the presence of the history is transmitted from the power transmission device 200A to the vehicle 100A, the history flag is set to the flag indicating the absence of the history.

If the history flag transmitted from the power transmission device 200A to the vehicle 100A is the flag indicating the presence of the history, the charge ECU 150A of the vehicle 100A sends a command for start of power transmission, to the power transmission device 200A, irrespective of the time schedule of timer-controlled charge.

Next, one example of operation of the power transmission device 200A and the vehicle 100A when contactless charging is forcedly started before the charge start time comes in the contactless power transfer system 1A will be described.

Figure 6:
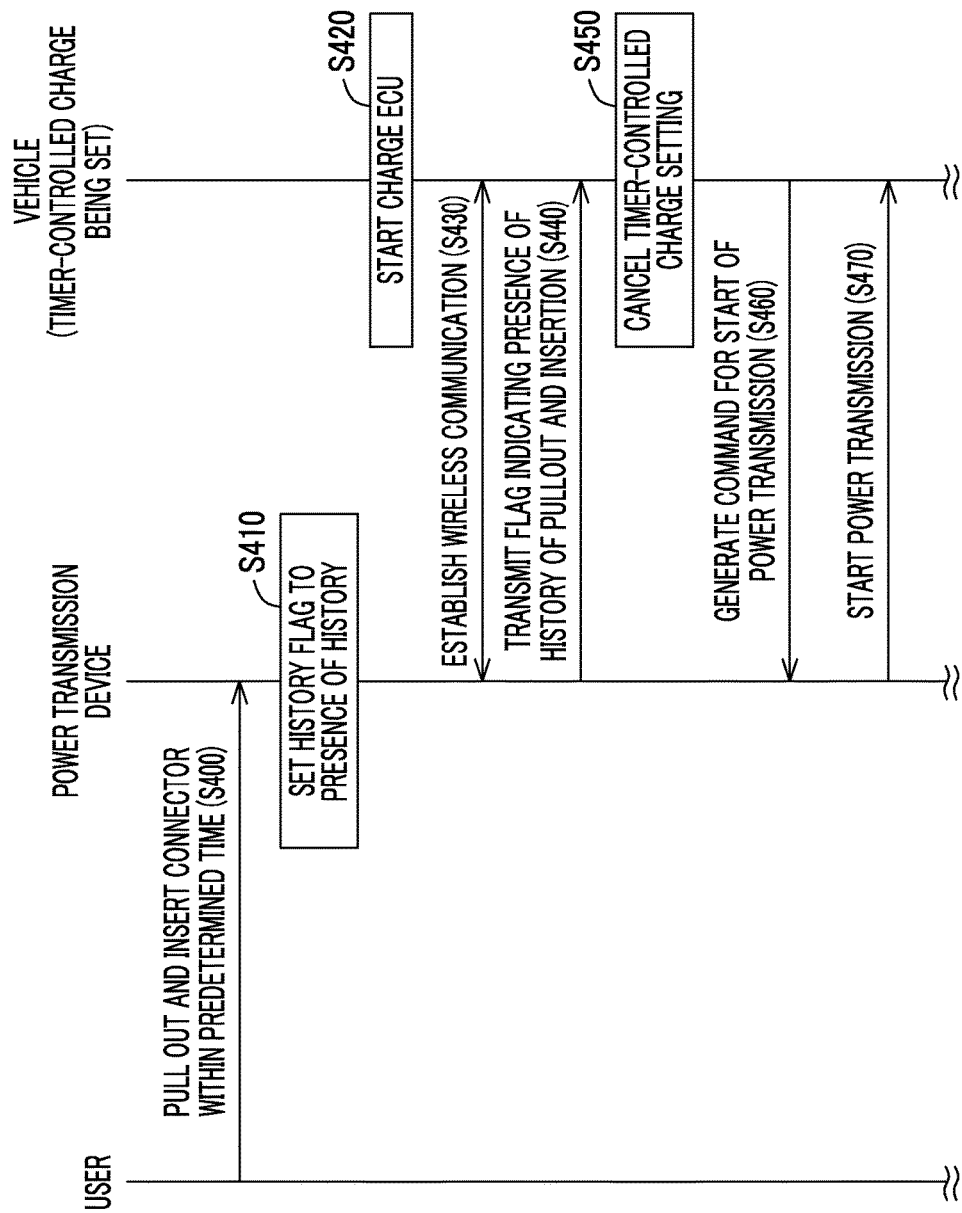
FIG. 6 is a sequence diagram showing an example in which contactless charging is forcedly started before the charge start time comes in the contactless power transfer system.

FIG. 6 is a sequence diagram showing an example in which contactless charging is forcedly started before the charge start time comes in the contactless power transfer system 1A. Referring to FIG. 6, operation of the user, processing of the power transmission device 200A, and processing of the vehicle 100A are indicated in this order as viewed from the left-hand side, and the time elapses in a direction from the upper side toward the lower side. In this example, timer-controlled charge setting is conducted in the vehicle 100A.

If the user performs a series of manipulations (pullout of the connector 310 from the system power supply 400 and insertion of the connector 310 into the system power supply 400) within a predetermined period of time (step S400), the history flag is set to the flag indicating the presence of the history, in the power transmission device 200A (step S410). Then, when the start time of intermittent start-up comes, the charge ECU 150A starts in the vehicle 100A (step S420).

If the charge ECU 150A is started in the vehicle 100A, a request for establishment of wireless communication is transmitted from the vehicle 100A to the power transmission device 200A, and wireless communication is established between the vehicle 100A and the power transmission device 200A (step S430). In this example, the series of manipulations was performed by the user within the predetermined period of time in step S400; therefore, after wireless communication is established, the flag indicating the presence of the history (signal indicating the history of performance of the series of manipulations within the predetermined period of time) is transmitted from the power transmission device 200A to the vehicle 100A (step S440).

If the flag indicating the presence of the history is transmitted from the power transmission device 200A to the vehicle 100A, timer-controlled charge setting is cancelled in the vehicle 100A (step S450). Then, a command for start of power transmission is transmitted from the vehicle 100A to the power transmission device 200A, via wireless communication (step S460), and electric power starts being transmitted from the power transmission device 200A to the vehicle 100A, in response to the command for start of power transmission (step S470).

Thus, in the contactless power transfer system 1A according to the second embodiment, too, even if a trouble occurs to an input device (the timer-controlled charge setting unit 160), or the like, used for cancelling timer-controlled charge setting, the user is able to forcedly start contactless charging before the charge start time comes, by performing the series of manipulations within the predetermined period of time, as in the contactless power transfer system 1 according to the first embodiment.

FIG. 7 is a flowchart illustrating a control routine executed by the control device 230A of the power transmission device 200A. The control routine illustrated in this flowchart is repeatedly executed by the control device 230A.

Referring to FIG. 7, the control device 230A determines whether the connector 310 was pulled out from and inserted into the system power supply 400 within a predetermined period of time (step S500). If it is determined that the connector 310 was pulled out of and inserted into the system power supply 400 within the predetermined period of time (YES in step S500), the control device 230A sets the history flag to the flag indicating the presence of the history (step S510). This is done so as to transmit the information that the series of manipulations was performed by the user within the predetermined period of time, from the power transmission device 200A to the vehicle 100A, after wireless transmission is established between the vehicle 100A and the power transmission device 200A.

If the history flag is set to the flag indicating the presence of the history, or it is determined in step S500 that the connector 310 has not been (was not) pulled out of and inserted into the system power supply 400 within the predetermined time (NO in step S500), the control device 230A determines whether wireless communication is established between the communicating unit 220 of the power transmission device 200A and the communicating unit 140 of the vehicle 100A (step S520). As described above, the charge ECU 150A is intermittently started, and controls the communicating unit 140 so as to send (transmit) a request for establishment of wireless communication to the power transmission device 200A when it is started. Accordingly, when the charge ECU 150 is stopped, no request for establishment of wireless communication is received by the communicating unit 220; therefore, it is determined that wireless communication is not established (NO in step S520), and the control proceeds to "RETURN".

If it is determined that wireless communication is established (YES in step S520), the control device 230A determines whether the flag indicating the presence of the history has already been transmitted to the vehicle 100A (step S530). For example, the control device 230A stores a post-transmission flag indicating whether the flag indicating the presence of the history has been transmitted, in the internal memory, and determines whether the flag indicating the presence of the history has already been transmitted, by referring to the post-transmission flag. If it is determined that the flag indicating the presence of the history has already been transmitted (YES in step S530), the control proceeds to step S570.

If it is determined that the flag indicating the presence of the history has not been transmitted (NO in step S530), the control device 230A determines whether the history flag is set to the flag indicating the presence of the history (step S540).

If it is determined that the history flag is not set to the flag indicating the presence of the history (NO in step S540), the control device 230A controls the communicating unit 220 so as to transmit a flag indicating the absence of the history to the vehicle 100 A (step S550). Then, the process proceeds to step S570.

If it is determined that the history flag is set to the flag indicating the presence of the history (YES in step S540), the control device 230A controls the communicating unit 220 so as to transmit the flag indicating the presence of the history to the vehicle 100A, thereby to inform the vehicle 100A that the series of manipulations was performed by the user within the predetermined period of time (step S560). Then, steps S570-S595 are executed. Tasks of steps S570-S595 are respectively identical with or similar to those of step S220-S250 of FIG. 3.

Thus, when the series of manipulations was performed by the user within the predetermined period of time before establishment of wireless communication, the power transmission device 200A of the second embodiment transmits the flag indicating the presence of the history to the vehicle 100A after wireless communication is established. Accordingly, the power transmission device 200A can inform the vehicle 100A, when wireless communication is established between the communicating units 140, 220, that the series of manipulations was performed within the predetermined period of time while wireless communication has not been established between the communicating units 140, 220.

FIG. 8 is a flowchart illustrating a control routine executed by the charge ECU 150A of the vehicle 100A when timer-controlled charge is set. The charge ECU 150A is started when the charge start time for timer-controlled charge comes, or a predetermined interval at which the vehicle system starts up intermittently elapses. After the charge ECU 150A is started, the routine illustrated in the flowchart of FIG. 8 is executed by the charge ECU 150A.

As in the first embodiment, when the time measured by the timer 165 reaches the charge start time, an interrupt routine for starting the charge ECU 150A that has been stopped is executed, in the charge ECU 150A. Also, when a lapse of the predetermined interval of intermittent start-up is calculated by means of the timer 165, the interrupt routine for starting the charge ECU 150A that has been stopped is executed, in the charge ECU 150A.

Referring to FIG. 8, if the interrupt routines is executed for either of the above reasons, the charge ECU 150A is started (step S600). Then, the charge ECU 150A controls the communicating unit 140 so as to transmit a request for establishment of wireless communication, to the power transmission device 200A (step S610). As a result, wireless communication is established between the vehicle 100A and the power transmission device 200A.

Then, the charge ECU 150A determines whether execution of the interrupt routine is caused by coming of the charge start time, or caused by the lapse of the predetermined interval of intermittent start-up (step S620). If execution of the interrupt routine is caused by coming of the charge start time ("COMING OF TIME" in step S620), the control proceeds to step S650, and a command for start of power transmission is transmitted from the vehicle 100A to the power transmission device 200A.

If it is determined that execution of the interrupt routine is caused by the lapse of the predetermined interval of intermittent start-up ("LAPSE OF PREDETERMINED INTERVAL" in step S620), the charge ECU 150A determines whether the flag indicating the presence of the history has been received from the power transmission device 200A, or the flag indicating the absence of the history has been received from the power transmission device 200A (step S630). If it is determined that the flag indicating the absence of the history has been received ("ABSENCE" in step S630), it cannot be said that the user's intention to cancel timer-controlled charge setting is indicated, and therefore, the control proceeds to "END".

On the other hand, if it is determined that the flag indicating the presence of the history has been received ("PRESENCE" in step S630), it can be said that the user's intention to cancel timer-controlled charge setting is indicated; therefore, the charge ECU 150A cancels timer-controlled charge setting (step S640). Then, in step S650, the command for start of power transmission is transmitted from the vehicle 100A to the power transmission device 200A, and contactless charging is carried out through tasks of steps S660-S690. The tasks of steps S650-S690 are respectively identical with or similar to those of steps S340-S380 of FIG. 4.

Thus, in the vehicle 100A according to the second embodiment, timer-controlled charge setting is cancelled when the signal indicating the presence of the history is received by the communicating unit 140. Accordingly, even if a trouble occurs to the input device (the timer-controlled charge setting unit 160), or the like, used for cancelling timer-controlled charge setting, the user is able to cancel timer-controlled charge setting in the vehicle 100A, by performing the series of manipulations within the predetermined period of time.

As described above, in the contactless power transfer system 1A according to the second embodiment, if the user performs the series of manipulations within the predetermined period of time while timer-controlled charge is being set, the predetermined signal (flag indicating the presence of the history) is transmitted from the power transmission device 200A to the vehicle 100A. Then, when the vehicle 100A receives the predetermined signal (flag indicating the presence of the history), contactless charging is started irrespective of the preset time schedule. Accordingly, even if a trouble occurs to the input device (the timer-controlled charge setting unit 160), or the like, used for cancelling timer-controlled charge setting, the user is able to start contactless charging in the contactless power transfer system 1A, by performing the series of manipulations within the predetermined period of time.

The first and second embodiments have been described above as embodiments of this present disclosure. However, the present disclosure is not necessarily limited to these embodiments. Here, other embodiments will be described by way of example.

In the first and second embodiments, the connector 310 is provided at one end portion of the power supply cable 300, and the other end portion is constantly connected to the power transmission device 200, 200A. However, the arrangement of the power supply cable 300 is not limited to this. For example, one end portion of the power supply cable 300 may be constantly connected to the system power supply 400, and a connector that can be pulled out from and inserted into the power transmission device 200, 200A may be provided at the other end portion. In this case, a predetermined signal may be transmitted from the power transmission device 200, 200A to the vehicle 100, 100A when a series of manipulations, i.e., pulling out the connector from the power transmission device 200, 200A, and then, inserting the connector again into the power transmission device 200, 200A, are performed within a predetermined period of time.

Also, connectors may be provided at opposite end portions of the power supply cable 300. In this case, a predetermined signal may be transmitted from the power transmission device 200, 200A to the vehicle 100, 100A, when pullout and insertion of any of the connectors are performed within a predetermined period of time.

In the first and second embodiments, the series of manipulations consists of pulling out the connector 310 from the system power supply 400 once, and then inserting the connector 310 into the system power supply 400 once. However, the series of manipulations is not necessarily limited to this. For example, the series of manipulations may consist of pulling out the connector 310 from the system power supply 400 two or more times and inserting the connector 310 into the system power supply 400 two or more times. In this case, a predetermined signal may be transmitted from the power transmission device 200, 200A to the vehicle 100, 100A when a difference between a point in time at which the connector 310 was pulled out from the system power supply 400 for the first time and a point in time at which the connector 310 was inserted into the system power supply 400 for the last time is within a predetermined period of time. In sum, the series of manipulations may include at least severing connection between the power transmission device 200, 200A and the system power supply 400 via the power supply cable 300 (at first), and then, connecting again the power transmission device 200, 200A with the system power supply 400 via the power supply cable 300 (last time).

Also, a switch for permitting and inhibiting supply of electric power from the system power supply 400 to the power transmission device 200 may be provided, for example. In this case, the series of manipulations may include placing the switch in an OFF state (inhibiting supply of electric power), and then placing the switch in an ON state (permitting supply of electric power), for example.

In the first and second embodiments, electric power is contactlessly transferred from the power transmission device 200, 200A to the vehicle 100, 100A. However, a device or system that receives electric power from the power transmission device 200, 200A is not necessarily limited to the vehicle 100, 100A. The device or system that receives electric power from the power transmission device 200, 200A may be a smartphone, cell phone, digital camera, or the like, which includes a battery.

In the first embodiment, the voltage sensor 117 detects receiving of request pulses by the power receiving coil 115. However, a device that detects the request pulses is not necessarily limited to this. For example, a current sensor that detects current received by the power receiving coil 115 may be used, so as to detect receiving of the request pulses by the power receiving coil 115.

In the above description, the power transmission device 200, 200A corresponds to one example of "power transmission device" according to this present disclosure, and the vehicle 100, 100A corresponds to one example of "power receiving device" according to the present disclosure. The power receiving unit 110, 110A corresponds to one example of "power receiving unit" according to the present disclosure, and the power storage device 120 corresponds to one example of "power storage device" according to the present disclosure, while the charge ECU 150, 150A corresponds to one example of "first electronic control unit" according to the present disclosure. The power transmitting unit 210 corresponds to one example of "power transmitting unit" according to the present disclosure, and the control device 230, 230A corresponds to one example of "second electronic control unit" according to the present disclosure. The communicating unit 140 corresponds to one embodiment of "first communicating unit" according to the present disclosure, and the communicating unit 220 corresponds to one embodiment of "second communicating unit" according to the present disclosure, while the internal memory of the control device 230, 230A corresponds to one example of "storage unit" according to the present disclosure.

The embodiments disclosed herein should be considered as being exemplary in all respects, and not restrictive. The scope of the present disclosure is defined or indicated by the appended claims, rather than the above description, and is intended to include all changes within the range of the claims and equivalents thereof.

What is claimed is:

1. A contactless power transfer system comprising:
   a power transmission device; and
   a power receiving device that contactlessly receives electric power from the power transmission device,
   wherein
   the power receiving device includes a power receiving circuit, a power storage device, and a first electronic controller, wherein
      the power receiving circuit contactlessly receives the electric power from the power transmission device,
      the power storage device stores the electric power received by the power receiving circuit, and
      the first electronic controller generates a first command for start of power transmission to the power transmission device, according to a preset time schedule, such that charging of the power storage device is started according to the preset time schedule,
   the power transmission device includes a power transmitting circuit and a second electronic controller, wherein
      the power transmitting circuit contactlessly transmits the electric power obtained from a power supply provided outside the power transmission device, to the power receiving circuit, in a condition where the power transmission device and the power supply are connected to each other via a power supply cable,
      the second electronic controller determines whether a series of manipulations including severing connection between the power transmission device and the power supply via the power supply cable, and then connecting the power transmission device with the power supply again via the power supply cable, are performed within a predetermined period of time, and
      the second electronic controller sends a predetermined signal to the power receiving device when the second electronic controller determines that the series of manipulations are performed within the predetermined period of time, and
   the first electronic controller generates a second command for start of power transmission to the power transmission device, irrespective of the preset time schedule, when the first electronic controller receives the predetermined signal in a case where the preset time schedule is set.

2. The contactless power transfer system according to claim 1, wherein
the predetermined signal is pulsed electric power in a form of predetermined pulses,
the second electronic controller controls the power transmitting circuit so as to send the pulsed electric power to the power receiving circuit, when the second electronic controller determines that the series of manipulations are performed within the predetermined period of time, and
the first electronic controller generates the second command for start of power transmission to the power transmission device, irrespective of the preset time schedule, when the pulsed electric power is received by the power receiving circuit in a case where the preset time schedule is set.

3. The contactless power transfer system according to claim 1, wherein
the power receiving device includes a first communicating device that communicates with the power transmission device,
the power transmission device includes a second communicating device that communicates with the first communicating device, and a memory that stores a history of performance of the series of manipulations within the predetermined period of time,
the predetermined signal comprises a signal indicating the history,
the first electronic controller controls the first communicating device so as to intermittently establish communication between the first communicating device and the second communicating device, when the preset time schedule is set,
the second electronic controller controls the second communicating device so as to transmit the signal indicating the history to the first communicating device, when the history is stored in the memory in a case where the communication between the first communicating device and the second communicating device is established, and
the first electronic controller generates the second command for start of power transmission to the power transmission device, irrespective of the preset time schedule, when the signal indicating the history is received via the first communicating device in a case where the preset time schedule is set.

4. A power receiving device that contactlessly receives electric power from a power transmission device provided outside the power receiving device, the power transmission device including a power transmitting circuit and a second electronic controller, the power transmitting circuit contactlessly transmitting the electric power obtained from a power supply provided outside the power transmission device, to a power receiving circuit, in a condition where the power transmission device and the power supply are connected to each other via a power supply cable, the second electronic controller determining whether a series of manipulations including severing connection between the power transmission device and the power supply via the power supply cable, and then connecting the power transmission device with the power supply again via the power supply cable, are performed within a predetermined period of time, the second electronic controller sending a predetermined signal to the power receiving device when the second electronic controller determines that the series of manipulations are performed within the predetermined period of time, the power receiving device comprising:
the power receiving circuit that contactlessly receives the electric power from the power transmission device;
a power storage device that stores the electric power received by the power receiving circuit; and
a first electronic controller that generates a first command for start of power transmission to the power transmission device, according to a preset time schedule, such that charging of the power storage device is started according to the preset time schedule, wherein
the first electronic controller generates a second command for start of power transmission to the power transmission device, irrespective of the preset time schedule, when the first electronic controller receives the predetermined signal in a case where the preset time schedule is set.

5. A power transmission device that contactlessly transmits electric power to a power receiving device provided outside the power transmission device, the power receiving device including a power receiving circuit, a power storage device, and a first electronic controller, the power receiving circuit contactlessly receiving the electric power from the power transmission device, the power storage device storing the electric power received by the power receiving circuit, the first electronic controller generating a first command for start of power transmission to the power transmission device, according to a preset time schedule, such that charging of the power storage device is started according to the preset time schedule, the first electronic controller generating a second command for start of power transmission to the power transmission device, irrespective of the preset time schedule, when the first electronic controller receives a predetermined signal from the power transmission device in a case where the preset time schedule is set, the power transmission device comprising:
a power transmitting circuit that contactlessly transmits the electric power obtained from a power supply provided outside the power transmission device, to the power receiving circuit, in a condition where the power transmission device and the power supply are connected to each other via a power supply cable; and
a second electronic controller that determines whether a series of manipulations including severing connection between the power transmission device and the power supply via the power supply cable, and then connecting the power transmission device with the power supply again via the power supply cable, are performed within a predetermined period of time, wherein
the second electronic controller sends the predetermined signal to the power receiving device when the second electronic controller determines that the series of manipulations are performed within the predetermined period of time.

* * * * *